United States Patent [19]
Koma

[11] Patent Number: 6,146,070
[45] Date of Patent: Nov. 14, 2000

[54] BOLT/NUT UNFASTENING PREVENTING STRUCTURE

[75] Inventor: Masanori Koma, Tomioka, Japan

[73] Assignee: MTS Co. Ltd., Gunma-ken, Japan

[21] Appl. No.: 09/374,859

[22] Filed: Aug. 16, 1999

[30] Foreign Application Priority Data

| Mar. 9, 1998 | [JP] | Japan | 10-248885 |
| Mar. 5, 1999 | [JP] | Japan | 11-058727 |
| Mar. 8, 1999 | [JP] | Japan | 11-059543 |

[51] Int. Cl.[7] ............................. F16B 31/00; F16B 39/12
[52] U.S. Cl. ............................ 411/5; 411/222; 411/372.6; 411/432; 411/910
[58] Field of Search ............................... 411/3, 4, 5, 222, 411/432, 910, 372.5, 372.6

[56] References Cited

U.S. PATENT DOCUMENTS

| 3,512,447 | 5/1970 | Vaughn | 411/5 |
| 4,867,624 | 9/1989 | Walley | 411/3 |
| 5,927,917 | 7/1999 | Gibbons | 411/4 |

FOREIGN PATENT DOCUMENTS

| 2067699 | 7/1981 | United Kingdom | 411/5 |
| 2186936 | 8/1987 | United Kingdom | 411/4 |

*Primary Examiner*—Neill Wilson
*Attorney, Agent, or Firm*—Martin Smolowitz

[57] ABSTRACT

After a bolt (3) and a double-structured nut (6) are fastened to each other, it is not possible to unfasten the bolt (3) and nut (6), because a predetermined part of the nut (6) is designed to break when subjected to a predetermined torque necessary for fastening the nut (6), and thereby permitting the remaining part of the nut (6) to remain fastened securely to the bolt (3) after the fastening operation of the bolt (3) and nut (6) is performed. The nut (6) double-structure including a cylindrical cover member (7) may alternatively be utilized for a similar double-structured bolt head (42) having a protective cover (43).

14 Claims, 12 Drawing Sheets

BOLT/NUT UNFASTENING PREVENTING STRUCTURE

BACKGROUND OF THE INVENTION

1. Field of the invention

The present invention relates t o a bolt/nut unfastening preventing structure which makes it impossible to turn a fastening nut relative to its corresponding bolt engaged with this nut after completion of their fastening operation, thereby preventing assembled members fastened by these nut and bolt from being disassembled.

2. Description of the Related Art

Recently, some pieces of news reporting seditious events have reached to us that some of bolts fixing an electric power transmission lattice-type tower to its base, and also some bolts fixing a part of the rails of the Japanese railroad "Shinkansen" to its base are illegally unfastened or removed by someone not authorized. The causes of the above events are easiness in unfastening the bolt and the nut each having a conventional fastening structure, in which both a head portion of the bolt and the nut fitted to a shank portion of the bolt are carelessly exposed to the outside, and thereby permitting anyone to unfasten these bolt a nd nut in an easy manner.

SUMMARY OF THE INVENTION

It is an object of the present invention to provide a bolt/nut unfastening preventing structure which makes it impossible to turn a fixing nut relative to its corresponding bolt engaged with this nut after completion of their fastening operation, thereby preventing assembled members fastened by these nut and bolt from being disassembled.

It is another object of the present invention to provide a bolt/nut unfastening preventing structure which makes it impossible to effectively rotate a nut relative to a bolt engaged with the nut after completion of a fastening operation of the nut to the bolt with a predetermined torque.

It is further another object of the present invention to provide a bolt/nut unfastening preventing structure which makes it impossible to effectively rotate a bolt relative to a nut engaged with the bolt after completion of a fastening operation of the bolt to the nut with a predetermined torque.

According to a first aspect of the present invention, the above objects of the present invention are accomplished by providing:

a bolt/nut unfastening preventing structure comprising:

a bolt having its shank portion pass through through-holes of assembled members;

a fastening nut fitted to the bolt to fasten the assembled members therebetween;

a stopper nut fitted to the bolt after the assembled members are fastened between the fastening nut and the bolt, the stopper nut being disposed adjacent to the fastening nut side by side and in press-contact with the fastening nut to prevent the fastening nut from loosening;

the stopper nut being constructed of a main body portion and a driven portion, wherein the main body portion of the stopper nut is loosely received in an opening end portion of a cylindrical cover element so as to be capable of freely rotating relative to the opening end portion of the cover element, and is fastened tight to the fastening nut, wherein the driven portion of the stopper nut is not fitted to the shank portion of the bolt, but fitted to a driving portion of the cylindrical cover element to rotate together with the cylindrical cover member, the driving portion constituting the innermost portion of the cylindrical cover element;

wherein the stopper nut is further provided with a weak portion between the main body portion and the driven portion, the weak portion being determined in mechanical strength so as to be broken when a predetermined torque is applied to the cylindrical cover element to have the main body portion of the stopper nut fastened tight to the fastening nut.

According to a second aspect of the present invention, the above objects of the present invention are accomplished by providing:

a bolt/nut unfastening preventing structure comprising:

a double-structured nut constructed of an outer casing and an inner fastening member;

a bolt provided with a shank portion;

the double-structured nut being fitted to the shank portion of the bolt;

wherein, when the double-structured nut has the inner fastening member thereof fastened tight to the shank portion of the bolt with a predetermined torque, a predetermined part of the inner fastening member of the double-structured nut is broken to permit the outer casing of the double-structured nut to freely rotate relative to the remaining part of the inner fastening member thus fastened to the shank portion of the bolt.

According to a third aspect of the present invention, the above objects of the present invention are accomplished by providing:

In a bolt/nut unfastening preventing structure comprising: a double-structured nut constructed of an outer casing and an inner fastening member; a bolt provided with a shank portion; the double-structured nut being fitted to the shank portion of the bolt; wherein, when the double-structured nut has the inner fastening member thereof fastened tight to the shank portion of the bolt with a predetermined torque, a part of the inner fastening member of the double-structured nut is broken to permit the outer casing of the double-structured nut to freely rotate relative to the inner fastening member thus fastened to the shank portion of the bolt, the improvement wherein:

a predetermined part of the inner fastening member to be broken is fitted in the outer casing so as to not rotate relative to the outer casing;

the remaining part of the inner fastening member other than the predetermined part is fitted in the outer casing so as to be rotatable relative to the outer casing;

the predetermined part of the inner fastening member is connected with the remaining part of the inner fastening member through a weak portion;

whereby the inner fastening member is designed to be broken in the weak portion.

According to a fourth aspect of the present invention, the above objects of the present invention are accomplished by providing:

a bolt unfastening preventing structure comprising:

a bolt provided with a head portion;

a protective cover member fitted onto the head portion of the bolt so as to rotate together with the head portion of the bolt and not to separate therefrom;

the head portion of the bolt having a predetermined part thereof broken when subjected to a predetermined torque, to permit the predetermined part of the head portion of the bolt to freely rotate together with the protective cover member relative to the remaining part of the head portion of the bolt.

DETAILED DESCRIPTION OF THE PREFERRED EMBODIMENTS

Now, best modes of the present invention will be described in detail with reference to the accompanying FIGS. 1–23 drawings.

Figure 1:
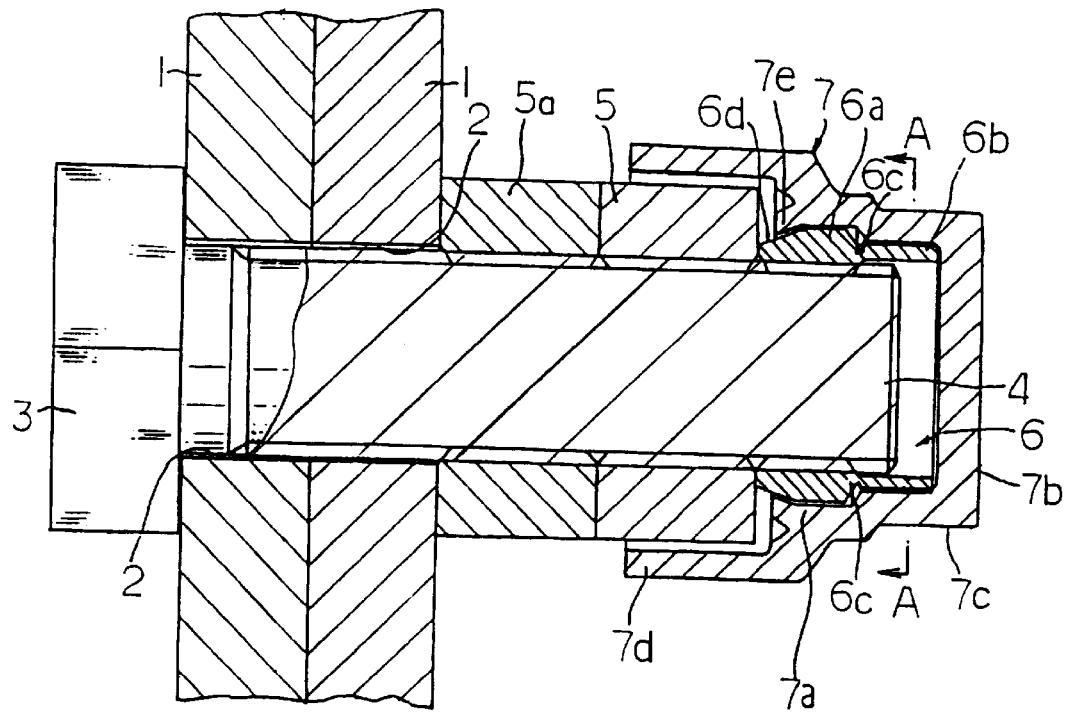
FIG. 1 is a longitudinal sectional view of the bolt/nut unfastening preventing structure of a first embodiment of the present invention.
Figure 2:
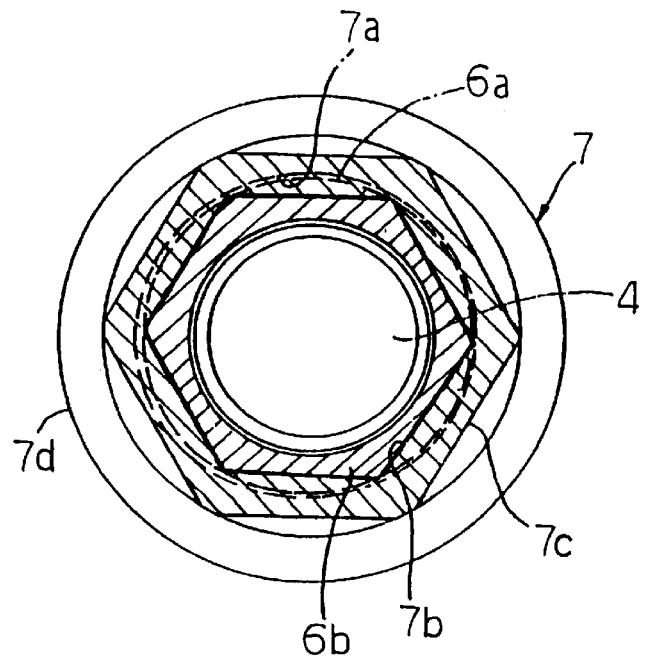
FIG. 2 is a cross-sectional view of the bolt/nut unfastening preventing structure of the first embodiment of the present invention, taken along the line A—A of FIG. 1.

In a first embodiment of a bolt/nut unfastening preventing structure of the present invention as shown by FIGS. 1 and 2, a bolt 3 has its shank portion 4 pass through through-holes 2 of assembled members 1. A fastening nut 5 is threadably fitted to the bolt 3 to fasten the assembled members 1 therebetween, and may include an adjacent nut 5a. A stopper nut 6 is threadably fitted to the bolt 3 after the assembled members 1 are fastened between the fastening nuts 5, 5a and the bolt 3. In this first embodiment of the present invention, the stopper nut 6 is disposed adjacent to the fastening nut 5 side by side and in press-contact with the fastening nut 5 to prevent the fastening nut 5 from loosening.

The stopper nut 6 is constructed of a main body portion 6a and a driven portion 6b. The main body portion 6a of the stopper nut 6 is loosely received in an opening end portion 7a of a cylindrical cover element 7 so as to be capable of freely rotating relative to the opening end portion 7a of the cover element 7, and is fastened tight to the fastening nut 5. The driven portion 6b of the stopper nut 6 is not fitted to the shank portion 4 of the bolt 3, but is fitted to a driving portion 7b of the cylindrical cover element 7 to rotate together with the cylindrical cover member 7. The driving portion 7b constitutes the innermost portion of the cylindrical cover element 7.

In this first embodiment of the present invention, as shown in FIG. 1, the stopper nut 6 is further provided with a weak portion 6c between the main body portion 6a and the driven portion 6b. This weak portion 6c is determined in mechanical strength so as to be broken when a predetermined torque is applied to the cylindrical cover element 7 so as to have the main body portion 6a of the stopper nut 6 fastened tight to the fastening nut 5.

In use, the shank portion 4 of the bolt 3 passes through both through-holes 2 of the assembled members 1, is then fitted in the fastening nut 5 and tightened so that two pieces of the assembled members 1 are fastened to each other. The shank portion 4 of the bolt 3 thus passed through the fastening nut 5 is further engaged with the main body portion 6a of the stopper nut 6. By turning the cylindrical cover member 7 fitted to the stopper nut 6 by means of a suitable turning tool such as spanners, torque wrenches and the like, the stopper nut 6 is fastened securely to the fastening nut 5.

At this time, torque applied to the cylindrical cover member 7 is transmitted from the driving portion 7b of the cylindrical cover member 7 to the driven portion 6b of the stopper nut 6. When the main body portion 6a of the stopper nut 6 is fastened to the fastening nut 5 with a predetermined amount of torque, the weak portion 6c of the stopper nut 6 is broken. As a result, the stopper nut 6 is divided into two pieces, i.e., the main body portion 6a and the driven portion 6b.

After the above division, the driven portion 6b of the stopper nut 6 is freely turnable together with the cylindrical cover member 7 relative to the bolt 3, since the driven portion 6b of the stopper nut 6 is not threadably engaged with the shank portion 4 of the bolt 3. Due to this free turning or lost motion of the cylindrical cover member 7 relative to the main body portion 6a of the stopper nut 6, it is not possible to transmit any torque from the cylindrical cover member 7 to the main body portion 6a of the stopper nut 6. Therefore, it is not possible for any person not authorized to unfasten the main body portion 6a of the stopper nut 6 from the shank portion 4 of the bolt 3 even when he or she may wish to unfasten the fastening nut 5 from the bolt 3, because the main body portion 6a of the stopper nut 6 remains fastened to shank portion 4 in its initial fastened position even when he or she turns the cylindrical cover member 7. Namely, the stopper nut 6 prevents the fastening nut 5 from being unfastened from the shank portion 4 of the bolt 3. As a result, it is possible for the first embodiment of the present invention to prevent any illegal unfastening operation of the bolt 3 and the fastening nut 5 from occurring.

In this first embodiment of the present invention shown in FIGS. 1 and 2, an outer peripheral portion of the main body portion 6a of the stopper nut 6 assumes a circular shape. On the other hand, an outer peripheral portion of the driven portion 6b of the stopper nut 6 assumes a hexagonal shape. Consequently, the cylindrical cover element 7 has its opening end portion 7a corresponding to the main body portion 6a of the stopper nut 6 formed into a circular shape capable of fitting onto the main body portion 6a of the stopper nut 6, and has its innermost driving portion 7b corresponding to the driven portion 6b of the stopper nut 6 formed into a hexagonal shape capable of fitting onto the driven portion 6b of the stopper nut 6. The weak portion 6c formed between the main body portion 6a and the driven portion 6b of the stopper nut 6 is constructed of an annular groove, a depth of which is so varied as to design the stopper nut 6 to break at a predetermined torque breaking point. On the other hand, an outer peripheral portion of the driving portion 7b of the cylindrical cover member 7 is formed into a sleeve-like driven portion 7c having a hexagonal shape in cross section, which enables this sleeve-like driven portion 7c to fit in a suitable turning tool such as box spanners, torque wrenches and the like. The opening end portion 7a of the cylindrical cover member 7 is provided with a sleeve-like extension portion 7d. This extension portion 7d covers substantially the entire portion of the fastening nut 5 disposed adjacent to the cylindrical cover member 7, which makes it substantially impossible for any one not authorized to access the fastening nut 5.

On the other hand, the stopper nut 6 is provided with a tapered portion 6d in a front end of the main body portion 6a of the stopper nut 6. This tapered portion 6d assumes a convergent shape toward its front end (i.e., left-hand end, as viewed in FIG. 1), in which shape its diameter is gradually reduced. The opening end portion 7a of the cylindrical cover member 7 has its front end portion 7e swaged or squeezed up against an outer peripheral surface of the tapered portion 6d of the stopper nut 6, so that the stopper nut 6 is retained in the cylindrical cover member 7, which prevents the stopper nut 6 from being separated from the cylindrical cover member 7.

Figure 3:
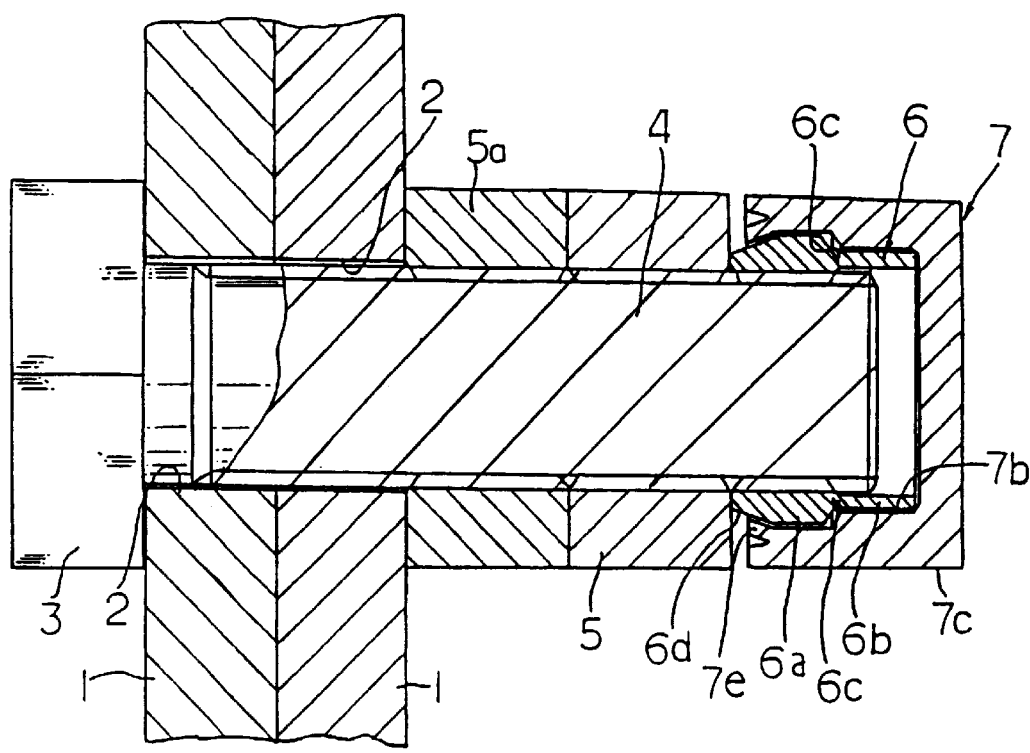
FIG. 3 is a longitudinal sectional view of the bolt/nut unfastening preventing structure of a first modification of the first embodiment of the present invention shown in FIGS. 1 and 2.

FIG. 3 shows a first modification of the first embodiment of the present invention shown in FIGS. 1 and 2. In this first modification of the first embodiment of the present invention as shown in FIG. 3, the cylindrical cover member 7 is formed into a cap nut having a hexagonal shape in cross section. In this modification, the cylindrical cover member or cap nut 7 has no extension portion 7d in contrast with the first embodiment of the present invention shown in FIGS. 1 and 2. Consequently, the fastening nut 5 disposed adjacent to the cylindrical cover member 7 is entirely exposed to the outside. As for the front end portion 7e of the opening end portion 7a of the cylindrical cover member 7 in this first modification shown in FIG. 3, this front end portion 7e is swaged or squeezed up against an outer peripheral surface of the tapered portion 6d of the stopper nut 6, so that the stopper nut 6 is retained in the cylindrical cover member 7, which prevents the stopper nut 6 from being separated from the cylindrical cover member 7, as is in the first embodiment of the present invention shown in FIG. 1.

The bolt/nut unfastening preventing structure of the first embodiment of the present invention has the following effect: namely, in the bolt/nut unfastening preventing structure of the first embodiment of the present invention, when a predetermined torque is applied to the stopper nut 6 through the cylindrical cover member 7, which the stopper nut 6 is retained in, to fasten the stopper nut 6 tight to the fastening nut 5, the stopper nut 6 is broken in its weak portion 6c so that its main body portion 6a disposed adjacent to the fastening nut 5 is separated from its driven portion 6b engaged with the cylindrical cover member 7, whereby the main body portion 6a remains in its fastened position in which the stopper nut 6 is fastened to the fastening nut 5. Due to the presence of the thus separated main body portion 6a of the stopper nut 6, it is possible to prevent each of the fastening nuts 5, 5a and the bolt 3 from being unfastened, without fail.

Figure 4:
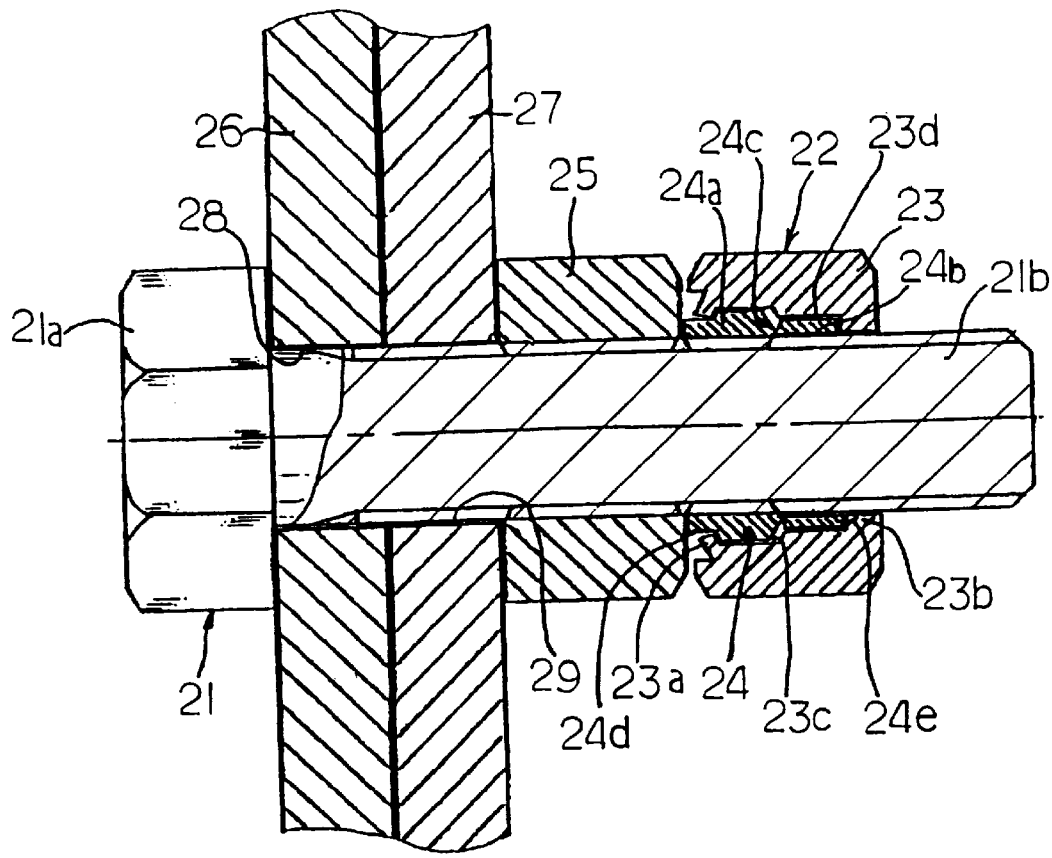
FIG. 4 is a longitudinal sectional view of the bolt/nut unfastening preventing structure according to a second embodiment of the present invention.
Figure 5:
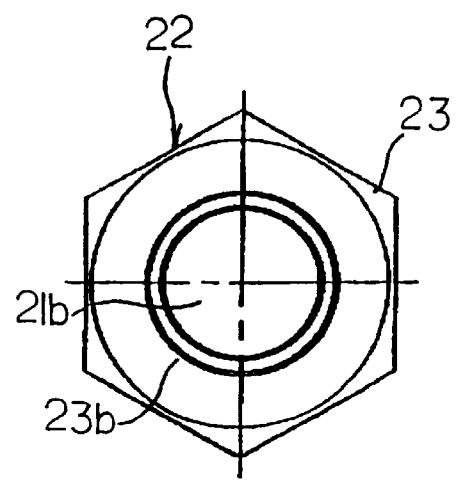
FIG. 5 is a right side view of the bolt/nut unfastening preventing structure of the present invent shown in FIG. 4.

FIGS. 4 and 5 show the bolt/nut unfastening preventing structure according to a second embodiment of the present invention. In the bolt/nut unfastening preventing structure of this second embodiment, a double-structured nut 22 is constructed of an outer casing 23 and an inner fastening member 24. A bolt 21 has its shank portion 21b threadably engaged with the double-structured nut 22. When the double-structured nut 22 has its inner fastening member 24 fastened tight to the shank portion 21b of the bolt 21 with a predetermined torque, a predetermined part 24b of the inner fastening member 24 of the double-structured nut 22 is broken at a week portion 24c to permit the outer casing 23 of the double-structured nut 22 to freely rotate relative to the remaining part 24a of the inner fastening member 24 thus fastened to the shank portion 21b of the bolt 21.

In the bolt/nut unfastening preventing structure of this second embodiment, since the predetermined part 24b of the inner fastening member 24 is broken and separated from the remaining part 24a thereof when the double-structured nut 22 is fastened tight to a fastening nut 25 with the predetermined torque, the outer casing 23 is capable of freely rotating together with the thus separated portion 24b relative to both the remaining part 24a and the bolt 21. Consequently, after the predetermined part 24b of the inner fastening member 24 is broken at 24c and separated from the remaining part 24a, it is impossible to transmit any torque from the outer casing 23 to the remaining part 24a of the inner fastening member 24 even when the outer casing 23 is rotated by means of the suitable turning tool such as spanners, torque wrenches and the like in a direction in which the double-structured nut 22 is unfastened from the bolt 21. Consequently, the remaining part 24a of the inner fastening member 24 remains fastened in its initial fastened position in which it is threadably engaged with the shank portion 21b of the bolt 21, without fail.

Figure 6:
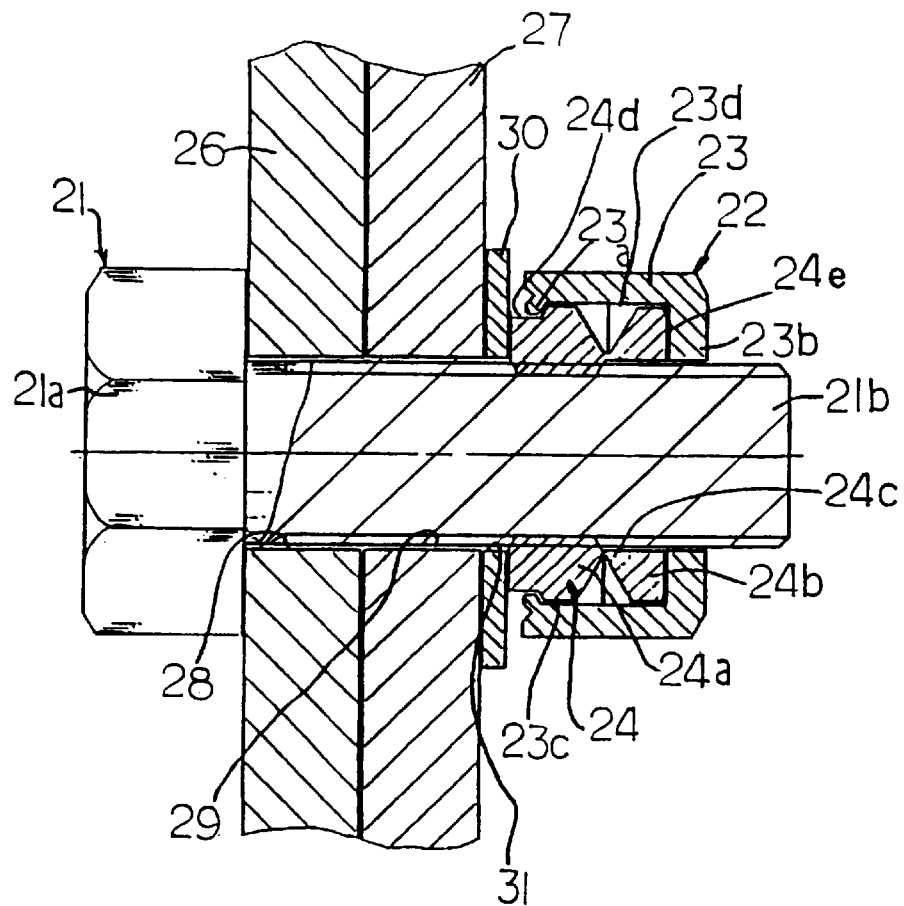
FIG. 6 is a longitudinal sectional view of the bolt/nut unfastening preventing structure of a third embodiment of the present invention, illustrating the bolt/nut connection portion thereof.
Figure 7:
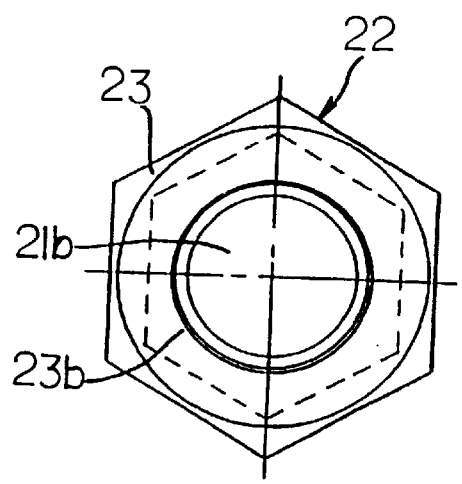
FIG. 7 is a right side view of the bolt/nut unfastening preventing structure of the present invention shown in FIG. 6.

FIGS. 6 and 7 show the bolt/nut unfastening preventing structure of a third embodiment of the present invention. In the bolt/nut unfastening preventing structure of this third embodiment, the double-structured nut 22 is constructed of the outer casing 23 and the inner fastening member 24. The bolt 21 has its shank portion 21b threadably engaged with the double-structured nut 22. When the double-structured nut 22 has its inner fastening member 24 fastened tight to the shank portion 21b of the bolt 21 with a predetermined torque, the predetermined part 24b of the inner fastening member 24 of the double-structured nut 22 is broken to permit the outer casing 23 of the double-structured nut 22 to freely rotate relative to the remaining part 24a of the inner fastening member 24 thus fastened to the shank portion 21b of the bolt 21.

In the bolt/nut unfastening preventing structure of this third embodiment having the above construction, the inner fastening member 24 to be broken is fitted in the outer casing 23 in a manner such that the inner fastening member 24 prevents its predetermined part 24b from rotating relative to the outer casing 23, and permits its remaining part 24a to rotate relative to the outer casing 23. The predetermined part 24b and the remaining part 24a of the inner fastening member 24 to be broken are integrated through a weak portion 24c in which the inner fastening member 24 is designed to be broken by a predetermined torque.

In the bolt/nut unfastening preventing structure of the third embodiment of the present invention shown in FIGS. 6 and 7, since the predetermined part 24b of the inner fastening member 24 is broken in its weak portion 24c and separated from the remaining part 24a thereof when the double-structured nut 22 is fastened tight to a the assembled members 26 through a washer 30 with the predetermined torque, the outer casing 23 is capable of freely rotating together with the thus separated portion 24b relative to both the remaining part 24a and the washer 30 fastened to the assembled members 26. Consequently, after the predetermined part 24b of the inner fastening member 24 is broken in its weak portion 24c and separated from the remaining part 24a, it is impossible to transmit any torque from the outer casing 23 to the remaining part 24a of the inner fastening member 24 even when the outer casing 23 is rotated by means of the suitable turning tool such as spanners, torque wrenches and the like in a direction in which the double-structured nut 22 is unfastened from the bolt 21. Consequently, the remaining part 24a of the inner fastening member 24 remains fastened in its initial fastened position in which it is threadably engaged with the shank portion 21b of the bolt 21, without fail.

In use, in the third embodiment of the present invention shown in FIGS. 6 and 7, the shank portion 21b of the bolt 21 passes through both the through-hole 28 of one member 26 of the assembled members 26, 27 and the through-hole 29 of the other member 27, so that these assembled members 26, 27 are clamped between the head portion 21a of the bolt 21 and the washer 30 urged by the double-structured nut 22 which is threadably engaged with the shank portion 21b of the bolt 21. In this third embodiment, the bolt/nut unfasten-ing preventing structure of the present invention is realized in the double-structured nut 22 disposed adjacent to the washer 30, as shown in FIG. 6. Further, in this third embodiment, an outer peripheral portion of the predetermined part 24b of the inner fastening member 24 assumes a regular hexagonal shape in cross section. On the other hand, the outer casing 23 has an inner peripheral portion of its part 23d corresponding to the predetermined part 24b of the inner fastening member 24 formed into a regular hexagonal shape in cross section, which may fit onto the above regular hexagonal outer peripheral portion of the predetermined part 24b of the inner fastening member 24. An outer peripheral portion of the remaining part 24a of the inner fastening member 24 assumes a circular shape in cross section. The outer casing 23 has an inner peripheral portion of its part 23c corresponding to the remaining part 24a of the inner fastening member 24 formed into a circular shape in cross section, which may fit onto the above circular outer peripheral portion of the remaining part 24a of the inner fastening member 24.

As is clear from FIG. 6, formed between the predetermined part 24b and the remaining part 24a of the inner fastening member 24 to be broken is an annular groove which assumes a V-shaped form in cross section. Due to the formation of this annular groove, the weak portion 24c is formed. In use, when a predetermined torque is applied to the inner fastening member 24 through the outer casing 23, a stress is concentrated at the V-shaped part of the weak portion 24c to cause the breakage of the inner fastening member 24 in its weak portion 24c, so that the inner fastening member 24 is divided into two pieces, i.e., the predetermined part 24b and the remaining part 24a.

The inner fastening member 24 has its remaining part 24a formed into a nut member which has its inner peripheral surface threaded. The outer casing 23 is coaxially fitted onto the inner fastening member 24 to form the double-structured nut 22 in which the outer casing 23 is so assembled as to be prevented from dropping out from the inner fastening member 24.

In the third embodiment shown in FIGS. 6 and 7, the outer casing 23 has an inner peripheral portion 23a of a front end of its opening portion swaged or squeezed up against a front side surface of an outer peripheral shoulder portion 24d of a base end portion of the inner fastening member 24, so that an inner surface of a flange portion 23b provided in a base end portion of the outer casing 23 is brought into press contact with a rear end surface 24e of the inner fastening member 24, whereby the outer casing 23 is prevented from dropping out from the inner fastening member 24.

Further, in the third embodiment shown in FIG. 6, the washer 30 may be constructed of an ordinary flat washer, or of a spring washer, or may be eliminated.

Figure 8:
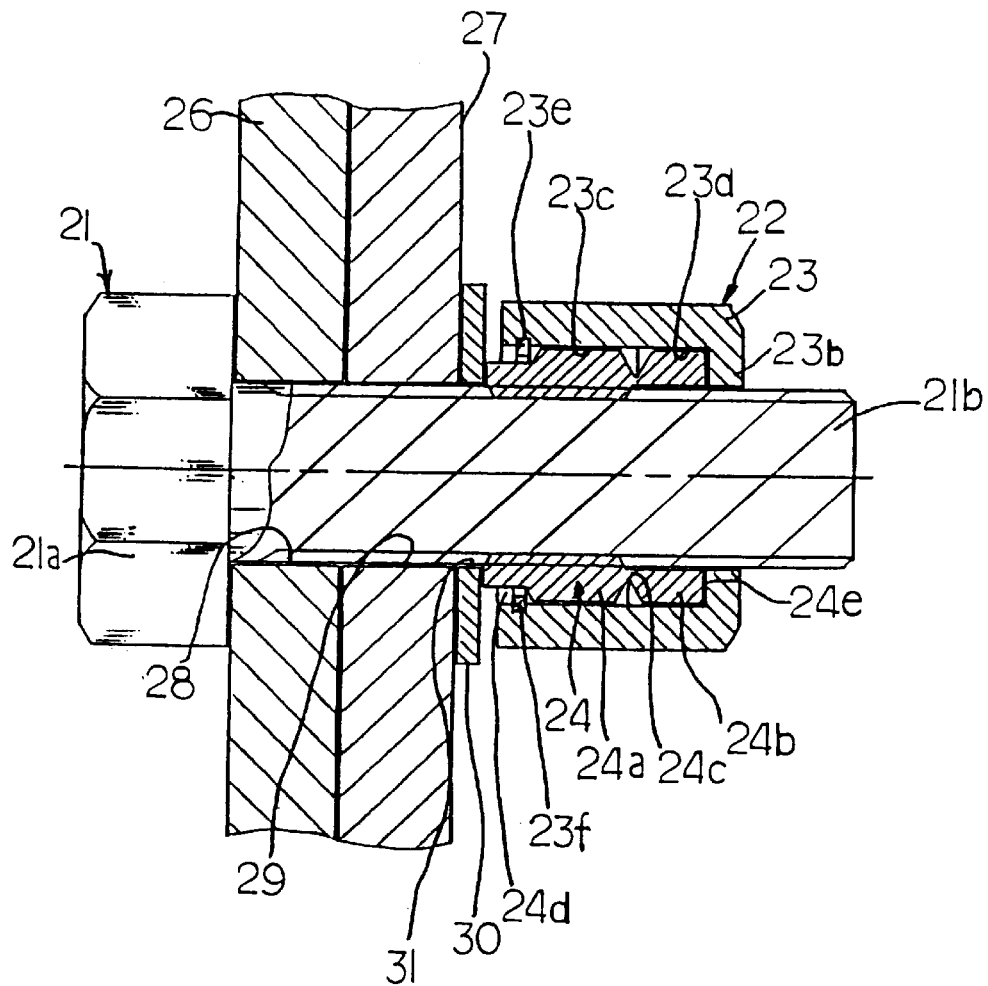
FIG. 8 is a longitudinal sectional view of the bolt/nut unfastening preventing structure of a first modification of the third embodiment of the present invention shown in FIG. 6, illustrating the bolt/nut connection portion thereof.
Figure 9:
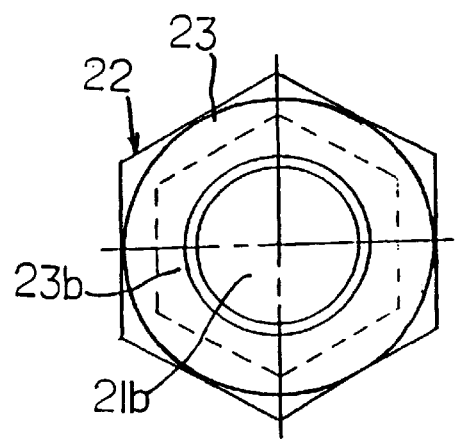
FIG. 9 is a right side view of the bolt/nut unfastening preventing structure of the present invention shown in FIG. 8.

FIGS. 8 and 9 show the bolt/nut unfastening preventing structure of a first modification of the third embodiment of the present invention shown in FIGS. 6 and 7. In this first modification of the third embodiment, the shank portion 21b of the bolt 21 passes through each of the through-hole 28 of one member 26 of the assembled members 26, 27, the through-hole 29 of the other member 27, and a through-hole 31 of the washer 30, so that these assembled members 26, 27 are clamped between the head portion 21a of the bolt 21 and the washer 30 urged by the double-structured nut 22 which is threadably engaged with the shank portion 21b of the bolt 21. In this first modification of the third embodiment, the bolt/nut unfastening preventing structure of the present invention is realized in the double-structured nut 22 disposed adjacent to the washer 30, as shown in FIG. 8. Further, in this first modification of the third embodiment, an outer peripheral portion of the predetermined part 24b of the inner fastening member 24 assumes a regular hexagonal shape in cross section. On the other hand, the outer casing 23 has an inner peripheral portion of its part 23d corresponding to the predetermined part 24b of the inner fastening member 24 formed into a regular hexagonal shape in cross section, which enables the part 23d of the outer casing 23 to fit onto the above regular hexagonal outer peripheral portion of the predetermined part 24b of the inner fastening member 24. An outer peripheral portion of the remaining part 24a of the inner fastening member 24 assumes a circular shape in cross section. The outer casing 23 has an inner peripheral portion of its part 23c corresponding to the remaining part 24a of the inner fastening member 24 formed into a circular shape in cross section, which enables the part 23c of the outer casing 23 to fit onto the above circular outer peripheral portion of the remaining part 24a of the inner fastening member 24.

As is clear from the FIG. 8, formed between the predetermined part 24b and the remaining part 24a of the inner fastening member 24 to be broken is an annular groove which assumes a V-shaped form in cross section. Due to the formation of this annular groove, the weak portion 24c is formed. In use, when a predetermined torque is applied to the inner fastening member 24 through the outer casing 23, a stress is concentrated at the V-shaped part of the weak portion 24c to cause the breakage of the inner fastening member 24 in this weak portion 24c, so that the inner fastening member 24 is divided into two pieces, i.e., the predetermined part 24b and the remaining part 24a.

The inner fastening member 24 has its remaining part 24a formed into a nut member which has its inner peripheral surface threaded. The outer casing 23 is coaxially fitted onto the inner fastening member 24 to form the double-structured nut 22 in which the outer casing 23 is so assembled as to be prevented from dropping out from the inner fastening member 24.

In the first modification of the third embodiment, as shown in FIG. 8, a C-shaped retaining ring 23f is fitted in an annular groove 23e which is formed in an inner peripheral surface of a front end opening portion of the outer casing 23. This retaining ring 23f thus fitted in the annular groove 23e of the outer casing 23 is then engaged with the outer peripheral annular shoulder portion 24d of the outer casing member 23. On the other hand, the outer casing member 23 has its inner flange portion 23b formed adjacent to a base end opening portion of the outer casing 23. The thus formed inner flange portion 23b has its inner end surface brought into press contact with the rear end surface 24e of the inner fastening member 24, so that the outer casing 23 is prevented from being dropped out from the inner fastening member 24.

Further, in the third embodiment shown in FIG. 8, the washer 30 may be constructed of an ordinary flat washer, or of a spring washer, or may be eliminated.

Figure 10:
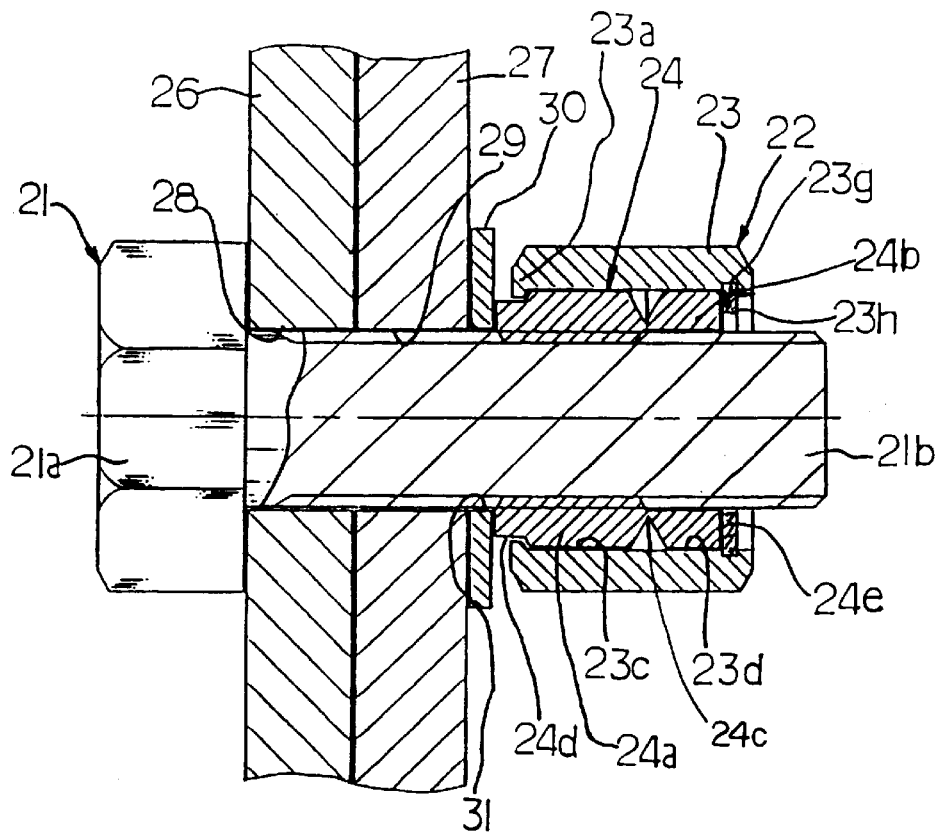
FIG. 10 is a longitudinal sectional view of the bolt/nut unfastening preventing structure of a second modification of the third embodiment of the present invention shown in FIG. 6, illustrating the bolt/nut connection portion thereof.
Figure 11:
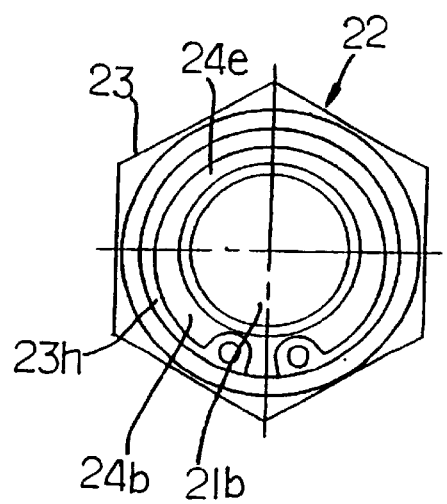
FIG. 11 is a right side view of the bolt/nut unfastening preventing structure of the present invention shown in FIG. 10.

FIGS. 10 and 11 show the bolt/nut unfastening preventing structure of a second modification of the third embodiment of the present invention shown in FIGS. 6 and 7. In this second modification of the third embodiment, the shank portion 21b of the bolt 21 passes through each of the through-hole 28 of one member 26 of the assembled members 26, 27, the through-hole 29 of the other member 27, and a through-hole 31 of the washer 30, so that these assembled members 26, 27 are clamped between the head portion 21a of the bolt 21 and the washer 30 urged by the double-structured nut 22 which is threadably engaged with the shank portion 21b of the bolt 21. In this second modification of the third embodiment, the bolt/nut unfastening preventing structure of the present invention is realized in the double-structured nut 22 itself disposed adjacent to the washer 30, as shown in FIG. 10. Further, in this second modification of the third embodiment, an outer peripheral portion of the predetermined part 24b (to be broken) of the inner fastening member 24 assumes a regular hexagonal shape in cross section. On the other hand, the outer casing 23 has an inner peripheral portion of its part 23d corresponding to the predetermined part 24b of the inner fastening member 24 formed into a regular hexagonal shape in cross section, which enables the inner part 23d of the outer casing 23 to fit onto the above regular hexagonal outer peripheral portion of the predetermined part 24b of the inner fastening member 24. An outer peripheral portion of the remaining part 24a of the inner fastening member 24 assumes a circular shape in cross section. The outer casing 23 has an inner peripheral portion of its part 23c corresponding to the remaining part 24a of the inner fastening member 24 formed into a circular shape in cross section, which enables the part 23c of the outer casing 23 to fit onto the above circular outer peripheral portion of the remaining part 24a of the inner fastening member 24.

As is clear from the FIG. 10, formed between the predetermined part 24b and the remaining part 24a of the inner fastening member 24 to be broken is an annular groove which assumes a V-shaped form in cross section. Due to the formation of this annular groove, the weak portion 24c is formed. In use, when a predetermined torque is applied to the inner fastening member 24 through the outer casing 23, a stress is concentrated at the V-shaped part of the weak portion 24c to cause the breakage of the inner fastening member 24 in this weak portion 24c, so that the inner fastening member 24 is divided into two pieces, i.e., the predetermined part 24b and the remaining part 24a.

The inner fastening member 24 has its remaining part 24a formed into a nut member which has its inner peripheral surface threaded. The outer casing 23 is coaxially fitted onto the inner fastening member 24 to form the double-structured nut 22 in which the outer casing 23 is so assembled as to be prevented from dropping out from the inner fastening member 24.

In the second modification of the third embodiment, as shown in FIG. 10, a C-shaped retaining ring 23h is fitted in an annular groove 23g which is formed in an inner peripheral surface of a rear end opening portion of the outer casing 23. This retaining ring 23h thus fitted in the annular groove 23g of the outer casing 23 is then engaged with a rear end surface 24e of a rear end portion of the inner fastening member 24. On the other hand, the inner fastening member 24 has an outer peripheral annular shoulder portion 24d of its front end portion brought into press contact with an inner peripheral annular projection 23a of a front end opening portion of the outer casing 23, so that the outer casing 23 is prevented from being dropped out from the inner fastening member 24.

Further, in this second modification of the third embodiment, as shown in FIG. 10, the washer 30 may be constructed of an ordinary flat washer, or of a spring washer, or may be eliminated.

Figure 12:
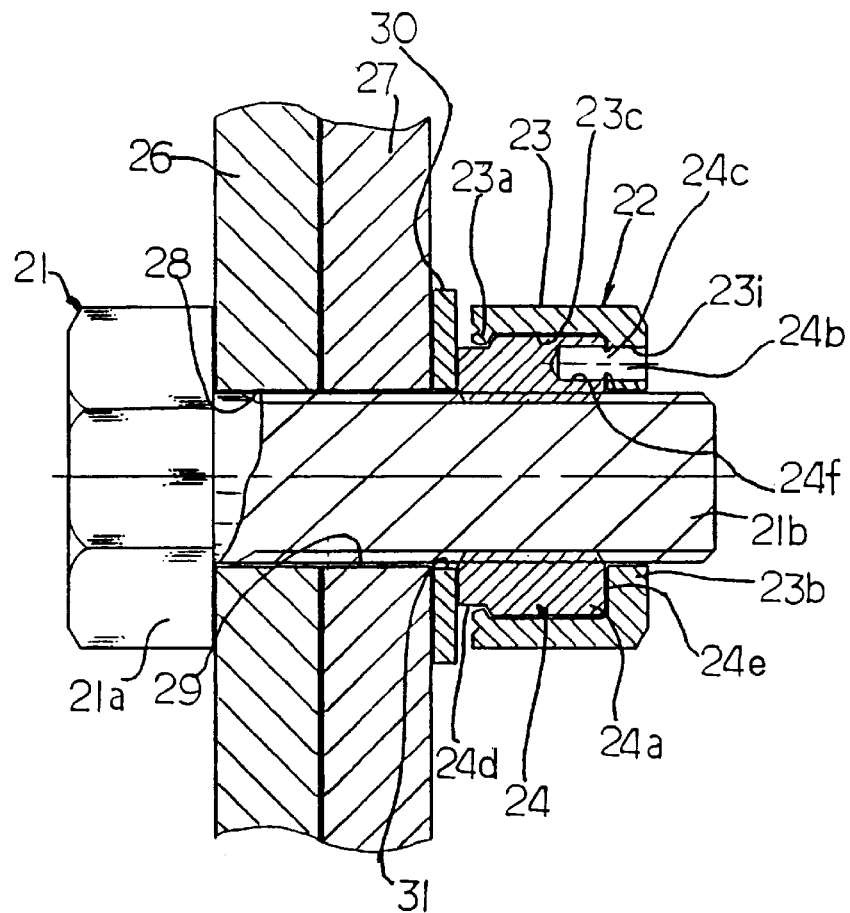
FIG. 12 is a longitudinal sectional view of the bolt/nut unfastening preventing structure of a third modification of the third embodiment of the present invention shown in FIG. 6, illustrating the bolt/nut connection portion thereof.
Figure 13:
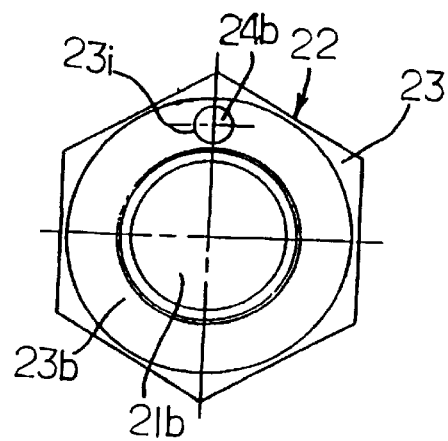
FIG. 13 is a right side view of the bolt/nut unfastening preventing structure of the present invention shown in FIG. 12.

FIGS. 12 and 13 show a third modification of the third embodiment of the present invention. In this third modification, as shown in FIG. 12, the shank portion 21b of the bolt 21 passes through each of the through-hole 28 of one member 26 of the assembled members 26, 27, the through-hole 29 of the other member 27, and the through-hole 31 of the washer 30, so that these assembled members 26, 27 are clamped between the head portion 21a of the bolt 21 and the washer 30 urged by the double-structured nut 22 which is threadably engaged with the shank portion 21b of the bolt 21. In this third modification of the third embodiment, the bolt/nut unfastening preventing structure of the present invention is realized in the double-structured nut 22 itself disposed adjacent to the washer 30.

Further, as shown in FIG. 12, in this third modification of the third embodiment, the predetermined part 24b (to be broken) of the inner fastening member 24 is constructed of a pin-like element fixedly mounted in a receiving bore 24f which is formed in a rear end surface of the remaining part 24a of the inner fastening member 24. This pin-like element 24b extends rearward from the rear end surface of the inner fastening member 24, and is fitted in a through-hole 23i of the inner flange portion 23b of the outer casing 23. An outer peripheral portion of the remaining part 24a of the inner fastening member 24 assumes a circular shape in cross section. The outer casing 23 has an inner peripheral portion of its part 23c corresponding to the remaining part 24a of the inner fastening member 24 formed into a circular shape in cross section, which enables the part 23c of the outer casing 23 to fit onto the above circular outer peripheral portion of the remaining part 24a of the inner fastening member 24.

As is clear from the FIG. 12, formed between the predetermined part 24b and the remaining part 24a of the inner fastening member 24 to be broken is an annular groove weak portion 24c which assumes a V-shaped form in cross section. Due to the formation of this annular groove, the weak portion 24c is formed in the predetermined part or pin-like element 24b. In use, when a predetermined torque is applied to the inner fastening member 24 through the outer casing 23, a stress is concentrated at the V-shaped part of the weak portion 24c of the pin-like element 24b to cause the breakage of the inner fastening member 24 in this weak portion 24c, so that the inner fastening member 24 is divided into two pieces, i.e., the predetermined part 24b and the remaining part 24a.

In this third modification of the third embodiment, it is also possible to provide a plurality of the pin-like elements 24b. Further, it is also possible to provide the pin-like element 24b in a side surface of the inner fastening member 24 instead of the rear end surface of the inner fastening member 24. Further, it is also possible to provide a plurality of the pin-like elements 24b in both the side surface and the rear end surface of the inner fastening member 24. Further, it is also possible to use a suitable extension of the inner fastening member 24 in place of the pin-like element 24b fitted in the remaining part 24a of the inner fastening member 24.

The inner fastening member 24 has its remaining part 24a formed into a nut member which has its inner peripheral surface threaded. The outer casing 23 is coaxially fitted onto the inner fastening member 24 to form the double-structured nut 22 in which the outer casing 23 is so assembled as to be prevented from dropping out from the inner fastening member 24.

In this third modification of the third embodiment, as shown in FIG. 12, the outer casing 23 has an inner peripheral portion 23a of a front end of its opening portion swaged or squeezed up against a front side surface of an outer peripheral shoulder portion 24d of the inner fastening member 24, so that an inner surface of a flange portion 23b provided in a base end portion of the outer casing 23 is brought into press contact with a rear end surface 24e of the inner fastening member 24, whereby the outer casing 23 is prevented from dropping out from the inner fastening member 24.

Further, in this third modification (shown in FIG. 12) of the third embodiment, the washer 30 may be constructed of an ordinary flat washer, or of a spring washer, or may be eliminated.

In each of the above embodiments and their modification, though each of the outer casing 23 and a part of the inner fastening member 24 to be broken assumes a regular hexagonal shape in cross section, it is also possible for each of the outer casing 23 and a part of the inner fastening member 24 to assume any other suitable shape such as square shapes, oval shapes and like shapes in cross section, provided that such suitable shape is capable of transmitting the torque from the outer casing 23 to the predetermined part 24b of the inner fastening member 24.

As is clear from the above description, the bolt/nut unfastening preventing structure of the second embodiment shown in FIG. 4 has the following effects: namely, in the bolt/nut unfastening preventing structure of the second embodiment, since the predetermined part 24b of the inner fastening member 24 is separated from the remaining part 24a thereof when the predetermined torque is applied to the double-structured nut 22 to fasten the nut 22 to the bolt 21. Consequently after such separation of the predetermined part 24b from the remaining part 24a of the inner fastening member 24, the inner fastening member 24 permits the predetermined part 24b thereof to freely rotate relative to the remaining part 24a of the inner fastening member 24, even when the torque is applied to the nut 22 in a direction in which the nut 22 is unfastened. Consequently, in this case, it is impossible for any one not authorized to turn or unfasten the nut 22 from the bolt 21.

As a result, the remaining part 24a of the inner fastening member 24 remains fastened in its initial fastened position in which the remaining part 24a is threadably engaged with the shank portion 21b of the bolt 21, which makes it impossible for any one not authorized to illegally unfasten the nut 22 from the bolt 21, without fail.

On the other hand, in the third embodiment of the bolt/nut unfastening preventing structure of the present invention shown in FIG. 6, when the predetermined torque is applied to the nut 22 to fasten the same tightly to the bolt 21, the inner fastening member 24 is broken in the weak portion 24c of the predetermined part 24b of the inner fastening member 24, so that the predetermined part 24b is separated from the remaining part 24a of the inner fastening member 24, which permits the outer casing 23 to freely rotate relative to the bolt 21. Due to such free rotation of the outer casing 23 relative to the bolt 21, any torque applied to the outer casing 23 can't be transmitted from the outer casing 23 to the remaining part 24a of the inner fastening member 24. Therefore, after the above separation of the predetermined part 24b of the inner fastening member 24, it is impossible to rotate the remaining part 24a of the inner fastening member 24 relative to the bolt 21. In other words, the remaining part 24a of the inner fastening member 24 remains fastened tightly to the bolt 21 in its initial fastened position in which the remaining part 24a is threadably engaged with the shank portion 21b of the bolt 21, which prevents, without fail, the nut 22 from being illegally unfastened.

Figure 14:
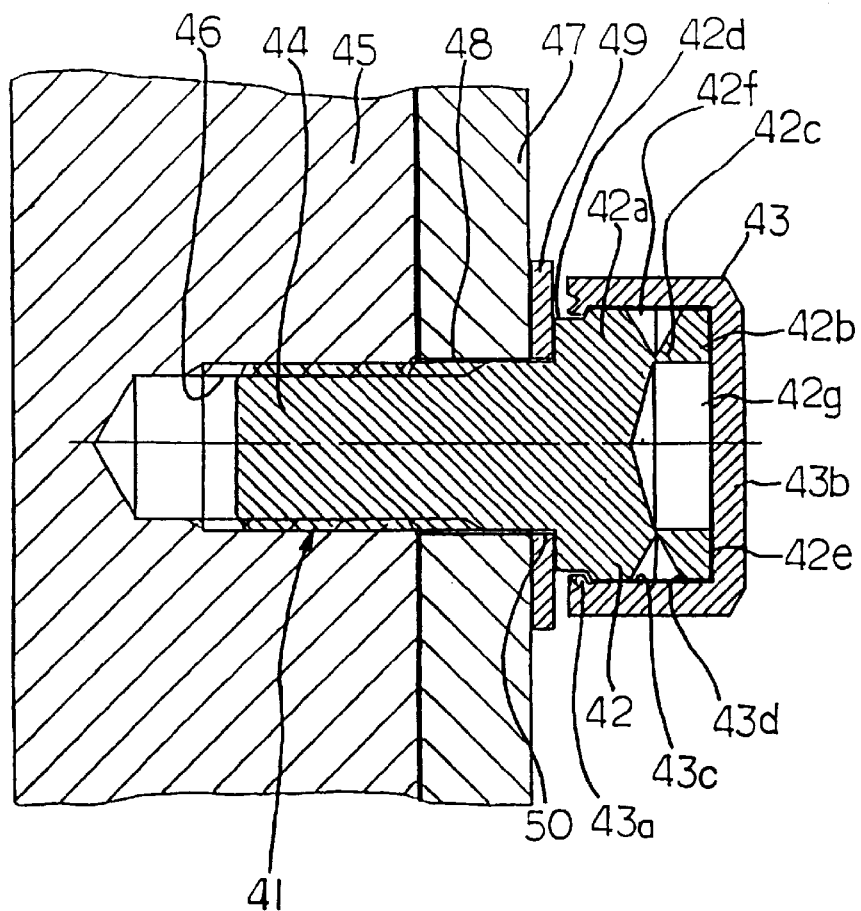
FIG. 14 is a longitudinal sectional view of the bolt unfastening preventing structure according to a fourth embodiment of the present invention, illustrating a bolt fastening portion thereof.
Figure 15:
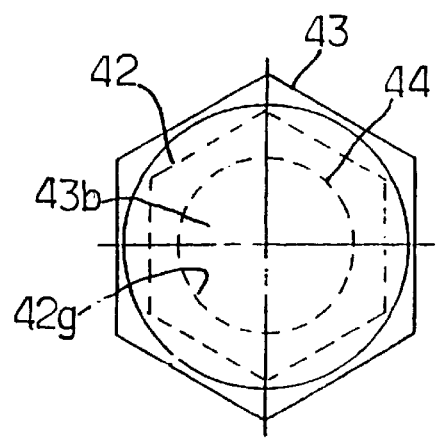
FIG. 15 is a right side view of the bolt unfastening preventing structure of the present invention shown in FIG. 14.

FIGS. 14 and 15 show a fourth embodiment of the bolt unfastening preventing structure of the present invention. In this fourth embodiment, a bolt 41 is provided with a head portion 42. A protective cover member 43 is fitted onto the head portion 42 of the bolt 41 so as to rotate together with the head portion 42 of the bolt 41 and not to separate therefrom. The head portion 42 of the bolt 41 has its predetermined part 42b broken when subjected to a predetermined torque so as, to permit the predetermined part 42b of the head portion 42 of the bolt 41 to freely rotate together with the protective cover member 43 relative to the remaining part 42a of the head portion 42 of the bolt 41.

In this fourth embodiment of the bolt unfastening preventing structure of the present invention, since the predetermined part 42b of the head portion 42 of the bolt 41 is broken and separated from the remaining part 42a when the bolt 41 is fastened tightly to the assembled members 45, 47 with a predetermined torque, it is possible for the protective cover member 43 to freely rotate relative to the bolt 41. Consequently, after such separation of the predetermined part 42b of the head portion 42 of the bolt 41, it is impossible to transmit any torque from the protective cover member 43 to the remaining part 42a of the head portion 42 of the bolt 41 when the protective cover member 43 is rotated by means of the suitable turning tool such as spanners, torque wrenches and the like in a direction in which the bolt 41 is unfastened from the assembled members 45, 47. Consequently, the remaining part 42a of the head portion 42 of the bolt 41 remains fastened, without fail, in its initial fastened position in which the shank portion 44 of the bolt 41 is threadably engaged with a tapped bore 46 of the assembled member 45.

In this fourth embodiment of the bolt unfastening preventing structure of the present invention, as shown in FIG. 14, the shank portion 44 of the bolt 41 passes through both the through-hole 50 of the washer 49 and the through-hole 48 of the assembled member 47, and is then threadably engaged with the tapped bore 46 of the other assembled member 45. By rotating the protective cover member 43 relative to the tapped bore 46 of the assembled member 45, it is possible to fasten both the assembled members 45, 47 to each other by means of the head portion 42 of the bolt 41 through the washer 49.

An outer peripheral portion of the predetermined part 42b (to be broken) of the head portion 42 of the bolt 41 assumes a regular hexagonal shape in cross section. On the other hand, the protective cover member 43 has an inner peripheral portion of its part 43d corresponding to the predetermined part 42b of the head portion 42 of the bolt 41 formed into a regular hexagonal shape in cross section, which may fit onto the above regular hexagonal outer peripheral portion of the predetermined part 42b of the head portion 42 of the bolt 41. An outer peripheral portion of the remaining part 42a of the head portion 42 of the bolt 41 assumes a circular shape in cross section. The protective cover member 43 has an inner peripheral portion of its part 43c corresponding to the remaining part 42a of the head portion 42 of the bolt 41 formed into a circular shape in cross section, which may fit onto the above circular outer peripheral portion of the remaining part 42a of the head portion 42 of the bolt 41.

As is clear from FIG. 14, formed in an outer peripheral surface of the head portion 42 of the bolt 41 between its predetermined part 42b and its remaining part 42a is an annular groove 42f which assumes a V-shaped form in cross section. Formed together with this annular groove 42f in the head portion 42 of the bolt 41 is a large-diameter concave portion 42g which is formed in a rear end surface of the head portion 42 of the bolt 41, as viewed in FIG. 14. Due to the formation of the above annular groove 42f, the weak portion 42c poor in thickness is formed. In use, when a predetermined torque is applied to the bolt 41 through the protective cover member 43, a stress is concentrated at a V-shaped part of the weak portion 42c to cause the breakage of the head portion 42 in its weak portion 42c, so that the head portion 42 of the bolt 41 is divided into two pieces, i.e., the predetermined part 42b and the remaining part 42a.

The protective cover member 43 is coaxially assembled with the head portion 42 of the bolt 41 in a manner such that the thus assembled protective cover member 43 is prevented from being dropped out from the head portion 42 of the bolt 41.

In the fourth embodiment shown in FIG. 14, the protective cover member 43 has an inner peripheral front end portion 43a of its opening portion swaged or squeezed against an outer peripheral shoulder portion 42d of the head portion 42 of the bolt in a manner such that the head portion 42 of the bolt 41 is retained in the protective cover member 43 in a condition in which the protective cover member 43 has its inner end surface 43b brought into press contact with a rear end surface 42e of the head portion 42 of the bolt 41, whereby the protective cover member 43 is prevented from dropping out from the head portion 42 of the bolt 41.

Figure 16:
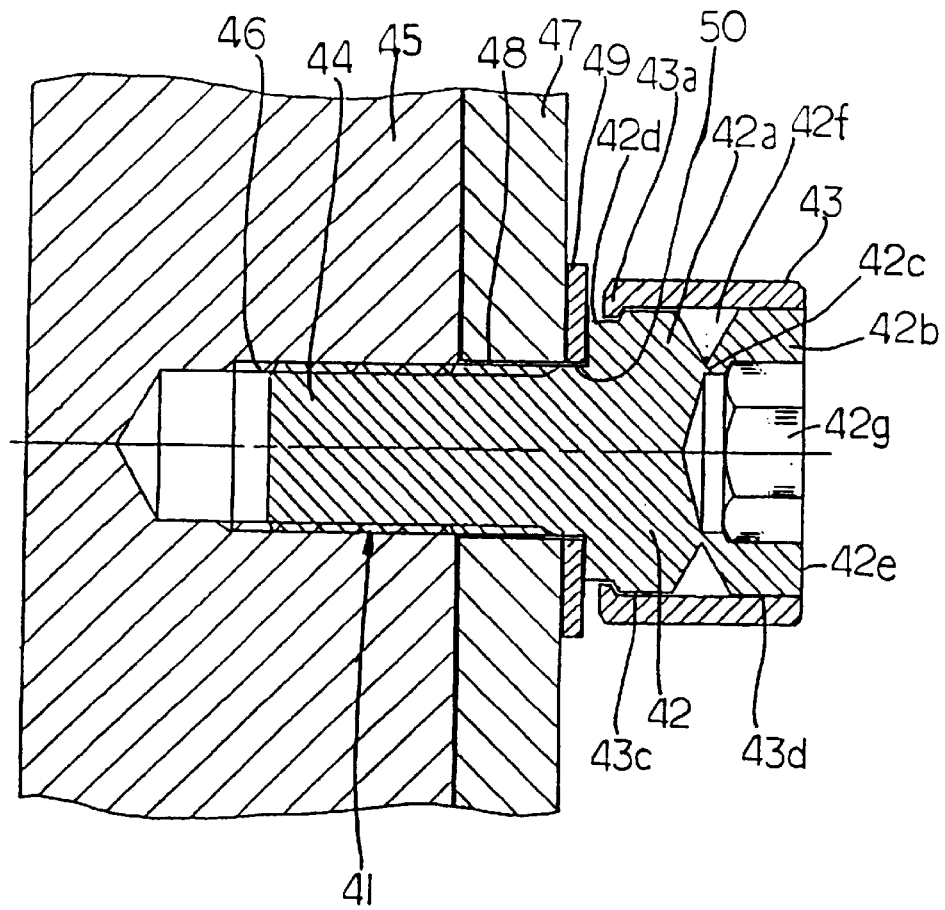
FIG. 16 is a longitudinal sectional view of the bolt unfastening preventing structure of a first modification of the fourth embodiment of the present invention shown in FIGS. 14 and 15, illustrating a bolt fastening portion thereof.
Figure 17:
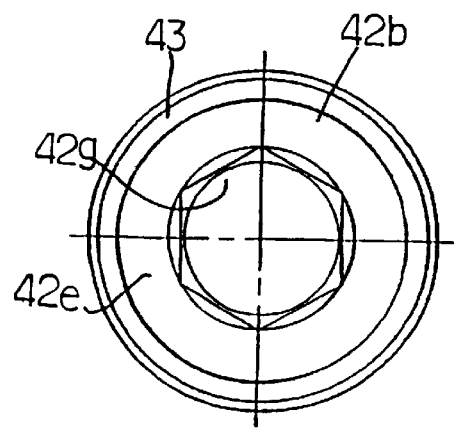
FIG. 17 is a right side view of the bolt unfastening preventing structure of the present invent shown in FIG. 16.

FIGS. 16 and 17 show a first modification of the fourth embodiment of the bolt unfastening preventing structure of the present invention shown in FIGS. 14 and 15. In this first modification of the fourth embodiment, the shank portion 44 of the bolt 41 passes through both the through-hole 50 of the washer 49 and the through-hole 48 of one member 47 of the assembled members 45, 47, and is then threadably engaged with the tapped hole 46 of the other member 45 of the assembled members 45, 47. The bolt 41 is tightened by rotating the protective cover member 43 relative to the assembled member 45. More specifically, when the protective cover member 43 is rotated, the assembled member 47 is fastened to the other assembled member 45 through the washer 49 urged by the head portion 42 of the bolt 41.

The predetermined part 42b (to be broken and separated) of the head portion 42 of the bolt 41 has its outer peripheral portion formed into a circular shape. On the other hand, the protective cover member 43 has an inner peripheral portion of its part 43d corresponding to the above separated part 42b of the bolt 41 also formed into a circular shape to permit the separated part 42b of the bolt 41 to be fitted in the corresponding part 43d of the protective cover member 43. An outer peripheral portion of the remaining part 42a of the head portion 42 of the bolt 41 assumes a circular shape. The protective cover member 43 has an inner peripheral portion of its part 43c corresponding to the above remaining part 42a of the bolt 41 also formed into a circular shape to permit the remaining part 42a of the bolt 41 to be loosely fitted in the part 43c of the protective cover member 43.

As is clear from FIG. 16, formed between the predetermined part 42b (to be broken and separated) and the remaining part 42a of the head portion 42 of the bolt 41 is the annular groove 42f which assumes a V-shaped form in cross section. Due to the formation of this annular groove 42f, the weak portion 42c is formed. Further formed in the rear end surface 42e of the head portion 42 of the bolt 41 is the large-diameter concave portion 42g having substantially a regular hexagonal shape in cross section.

In use, when the predetermined torque is applied to the head portion 42 of the bolt 41 through the protective cover member 43, a stress is concentrated at the V-shaped part of the weak portion 42c to cause the breakage of the head portion 42 of the bolt 41 in its weak portion 42c, so that the head portion 42 of the bolt 41 is divided into two pieces, i.e., the predetermined part 42b and the remaining part 42a.

As shown in FIGS. 16 and 17, the protective cover member 43 has its rear end portion entirely opened to expose the rear end surface 42e of the predetermined part 42b (to be broken and separated) of the head portion 42 of the bolt 41 to the outside. A suitable turning tool such as Allen wrenches and the like is fitted in the hexagonal concave portion 42g of the head portion 42 of the bolt 41 and turned to directly rotate the bolt 41 relative to the assembled member 45.

The protective cover member 43 is coaxially fitted onto the head portion 42 of the bolt 41 in a manner such that the protective cover member 43 does not drop out from the head portion 42 of the bolt 41.

In this first modification of the fourth embodiment, as shown in FIG. 16, the protective cover member 43 has an inner peripheral portion 43a of a front end of its front opening portion swaged or squeeze against a front side surface of an outer peripheral shoulder portion 42d of a base end portion of the head portion 42 of the bolt 41. On the other hand, the protective cover member 43 has its rear end portion press-fitted, or bonded, or welded to the predetermined part 42b of the head portion 42 of the bolt 41 to prevent the protective cover member 43 from dropping out from the head portion 42 of the bolt 41.

In order to fixedly mount the protective cover member 43 on the predetermined part 42b (to be broken and separated) of the head portion 42 of the bolt 41, it is also possible to press-fit a suitable lock pin (not shown) in a radial bore (not shown) of an outer peripheral portion of the predetermined part 42b (to be broken and separated) of the head portion 42 of the bolt 41 through a radial through-hole (not shown) of the protective cover member 43. Alternatively, it is also possible to press-fit a suitable lock pin (not shown) in a radial bore (not shown) of an outer peripheral portion of the predetermined part 42b (to be broken and separated) of the head portion 42 of the bolt 41 through an elongated circumferential through-hole (not shown) of the protective cover member 43. Alternatively, it is also possible that the protective cover member 43 has an inner peripheral portion 43a of a front end of its opening portion press-fitted to a front side surface of the outer peripheral shoulder portion 42d of the base end portion of the head portion 42 of the bolt 41.

Figure 18:
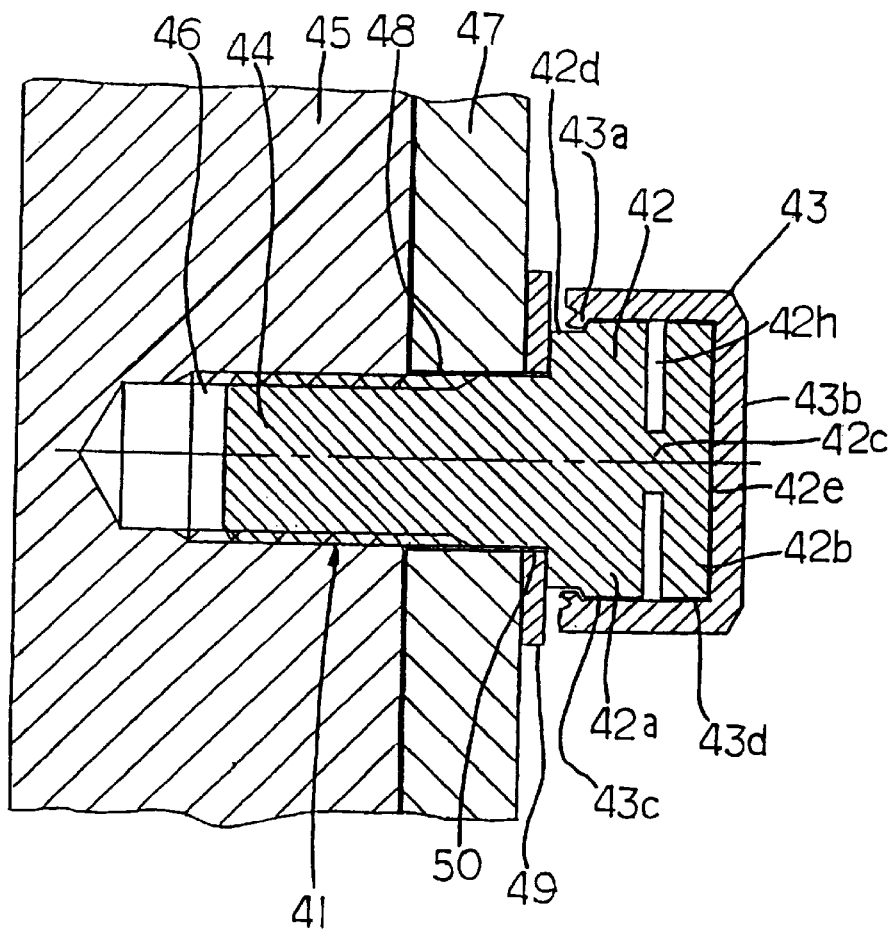
FIG. 18 longitudinal sectional view of the bolt unfastening preventing structure of a second modification of the fourth embodiment of the present invention shown in FIGS. 14 and 15, illustrating a bolt fastening portion thereof.
Figure 19:
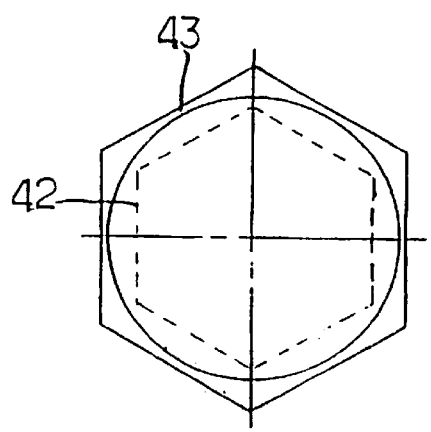
FIG. 19 is a right side view of the bolt unfastening preventing structure of the present invent shown in FIG. 18.

FIGS. 18 and 19 show the bolt unfastening preventing structure of a second modification of the fourth embodiment of the present invention shown in FIGS. 14 and 15. In this second modification of the fourth embodiment, as shown in FIG. 18, the shank portion 44 of the bolt 41 passes through both the through-hole 50 of the washer 49 and the through-hole 48 of one 47 of the assembled members 45, 47, and is then threadably engaged with the tapped hole 46 of the other 45 of the assembled members 45, 47. The bolt 41 is tightened by rotating the protective cover member 43 relative to the assembled member 45. More specifically, when the protective cover member 43 is rotated, the assembled member 47 is fastened to the other assembled member 45 through the washer 49 urged by the head portion 42 of the bolt 41.

As shown in FIGS. 18 and 19, an outer peripheral portion of the predetermined part 42b (to be broken and separated) of the head portion 42 of the bolt 41 assumes a regular hexagonal shape in cross section. On the other hand, the protective cover member 43 has an inner peripheral portion of its part 43d corresponding to the predetermined part 42b of the head portion 42 of the bolt 41 formed into a regular hexagonal shape in cross section, which may fit onto the above regular hexagonal outer peripheral portion of the predetermined part 42b of the head portion 42 of the bolt 41. An outer peripheral portion of the remaining part 42a of the head portion 42 of the bolt 41 assumes a circular shape in cross section. The protective cover member 43 has an inner peripheral portion of its part 43c corresponding to the remaining part 42a of the head portion 42 of the bolt 41 formed into a circular shape in cross section, which may loosely fit onto the above circular outer peripheral portion of the remaining part 42a of the head portion 42 of the bolt 41.

As is clear from FIG. 18, formed in an outer peripheral surface of the head portion 42 of the bolt 41 between its predetermined part 42b and its remaining part 42a is an annular groove 42h which assumes a U-shaped form in cross section. Due to the formation of this annular groove 42h, the weak portion 42c poor in diametrical thickness is formed. In use, when a predetermined torque is applied to the bolt 41 through the protective cover member 43, a stress is concentrated at the U-shaped part of the weak portion 42c to cause the breakage of the head portion 42 in its weak portion 42c, so that the head portion 42 of the bolt 41 is divided into two pieces, i.e., the predetermined part 42b and the remaining part 42a.

The protective cover member 43 is coaxially assembled with the head portion 42 of the bolt 41 in a manner such that the thus assembled protective cover member 43 is prevented from dropping out from the head portion 42 of the bolt 41.

In the second modification of the fourth embodiment, as shown in FIG. 18, the protective cover member 43 has an inner peripheral front end portion 43a of its opening portion swaged or squeezed against an outer peripheral shoulder portion 42d of the head portion 42 of the bolt 41 in a manner such that the head portion 42 of the bolt 41 is retained in the protective cover member 43 in a condition in which the protective cover member 43 has its inner end surface 43b brought into press contact with a rear end surface 42e of the head portion 42 of the bolt 41, whereby the protective cover member 43 is prevented from dropping out from the head portion 42 of the bolt 41.

Figure 20:
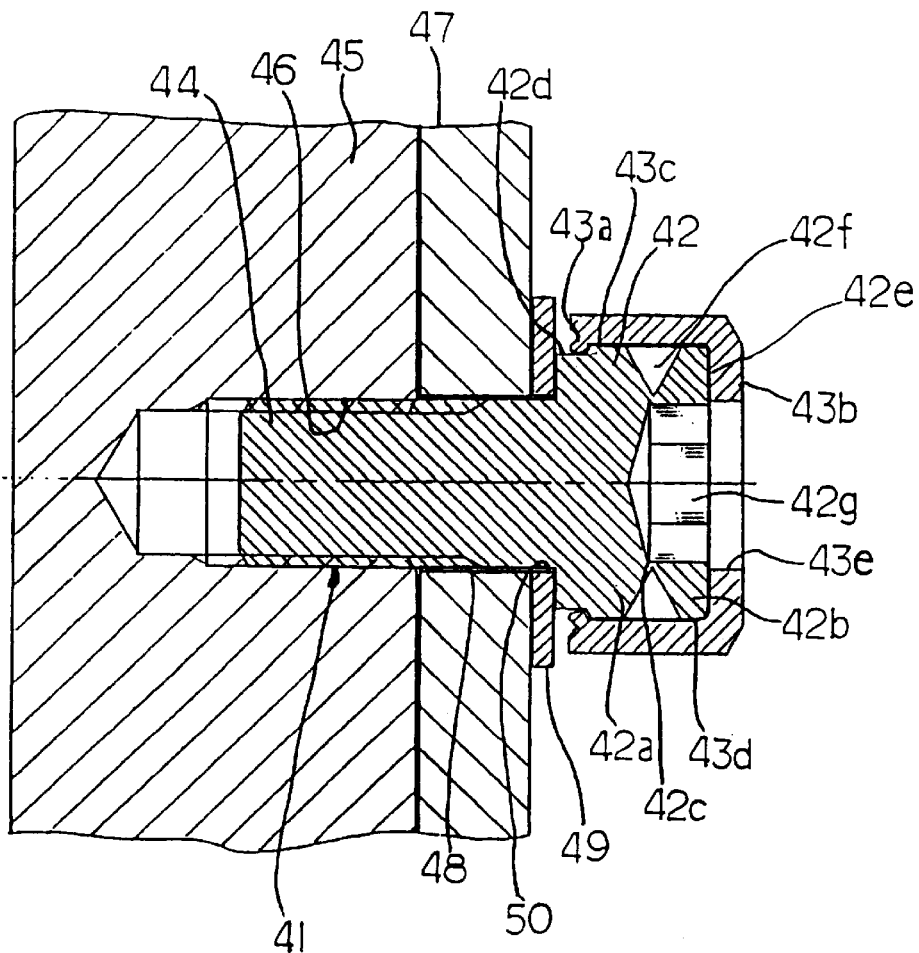
FIG. 20 is a longitudinal sectional view of the bolt unfastening preventing structure of a third modification of the fourth embodiment of the present invention shown in FIGS. 14 and 15, illustrating a bolt fastening portion thereof.

FIG. 20 shows a third modification of the fourth embodiment of the present invention. In this third modification of the fourth embodiment, as shown in FIG. 20, the shank portion 44 of the bolt 41 passes through both the through-hole 50 of the washer 49 and the through-hole 48 of one member 47 of the assembled members 45, 47, and is then threadably engaged with the tapped hole 46 of the other member 45 of the assembled members 45, 47. The bolt 41 is tightened by rotating the protective cover member 43 relative to the assembled member 45. More specifically, when the protective cover member 43 is rotated, the assembled member 47 is fastened to the other assembled member 45 through the washer 49 urged by the head portion 42 of the bolt 41.

Figure 21:
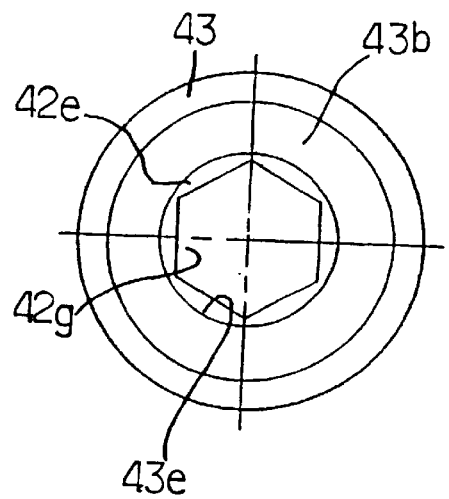
FIG. 21 is a right side view of the bolt unfastening preventing structure of the present invention shown in FIG. 20.

As shown in FIGS. 20 and 21, an outer peripheral portion of the predetermined part 42b (to be broken and separated) of the head portion 42 of the bolt 41 assumes a circular shape in cross section. On the other hand, the protective cover member 43 has an inner peripheral portion of its part 43d corresponding to the predetermined part 42b of the head portion 42 of the bolt 41 formed into a circular shape in cross section, which may fit onto the above regular circular outer peripheral portion of the predetermined part 42b of the head portion 42 of the bolt 41. An outer peripheral portion of the remaining part 42a of the head portion 42 of the bolt 41 assumes a circular shape in cross section. The protective cover member 43 has an inner peripheral portion of its part 43c corresponding to the remaining part 42a of the head portion 42 of the bolt 41 also formed into a circular shape in cross section, which may loosely fit onto the above circular outer peripheral portion of the remaining part 42a of the head portion 42 of the bolt 41.

As is clear from FIG. 20, formed in an outer peripheral surface of the head portion 42 of the bolt 41 between its predetermined part 42b and its remaining part 42a is the annular groove 42f which assumes a V-shaped form in cross section. Formed together with this annular groove 42f in the head portion 42 of the bolt 41 is the large-diameter concave portion 42g which is formed in a rear end surface of the head portion 42 of the bolt 41, as viewed in FIG. 20. Due to the formation of the above annular groove 42f, the weak portion 42c poor in thickness is formed. In use, when a predetermined torque is applied to the bolt 41, a stress is concentrated at a V-shaped part of the weak portion 42c to cause the breakage of the head portion 42 in its weak portion 42c, so that the head portion 42 of the bolt 41 is divided into two pieces, i.e., the predetermined part 42b and the remaining part 42a.

As is clear from FIGS. 20 and 21, the concave portion 42g formed in the rear end surface 42e of the head portion 42 of the bolt 41 is exposed to the outside through the rear end opening portion 43e of the protective cover member 43. This concave portion 42g of the bolt 41 has its inner surface portion formed into a regular hexagonal shape in cross section. A suitable turning tool such as Allen wrenches and the like is fitted in this concave portion 42g of the head portion 42 of the bolt 41 to directly turn the bolt 41.

The protective cover member 43 is coaxially assembled with the head portion 42 of the bolt 41 in a manner such that the thus assembled protective cover member 43 is prevented from being dropped out of the head portion 42 of the bolt 41.

In this third modification from the fourth embodiment, as shown in FIG. 20, the protective cover member 43 has an inner peripheral front end portion 43a of its opening portion swaged or squeezed against an outer peripheral shoulder portion 42d of the head portion 42 of the bolt 41 in a manner such that the head portion 42 of the bolt 41 is retained in the protective cover member 43 in a condition in which the protective cover member 43 has its inner end surface 43b brought into press contact with a rear end surface 42e of the head portion 42 of the bolt 41, whereby the protective cover member 43 is prevented from dropping out from the head portion 42 of the bolt 41.

It is also possible to fixedly mount the protective cover member 43 on the predetermined part 42b (to be broken and separated) of the head portion 42 of the bolt 41 by using a suitable lock pin (not shown) which is press-fitted in a radial bore (not shown) of an outer peripheral surface of the predetermined part 42b (to be broken and separated) of the head portion 42 of the bolt 41 through a radial bore (not shown) of an outer peripheral portion of the protective cover member 43. Alternatively, it is also possible to press-fit a suitable lock pin (not shown) in a radial bore (not shown) of an outer peripheral portion of the protective cover member 43 in a manner such that the lock pin (not shown) radially inwardly extends to enter an elongated circumferential hole (not shown) of the predetermined part 42b (to be broken and separated) of the head portion 42 of the bolt 41, so that the protective cover member 43 is rotatably mounted on the predetermined part 42b (to be broken and separated) of the head portion 42 of the bolt 41.

Figure 22:
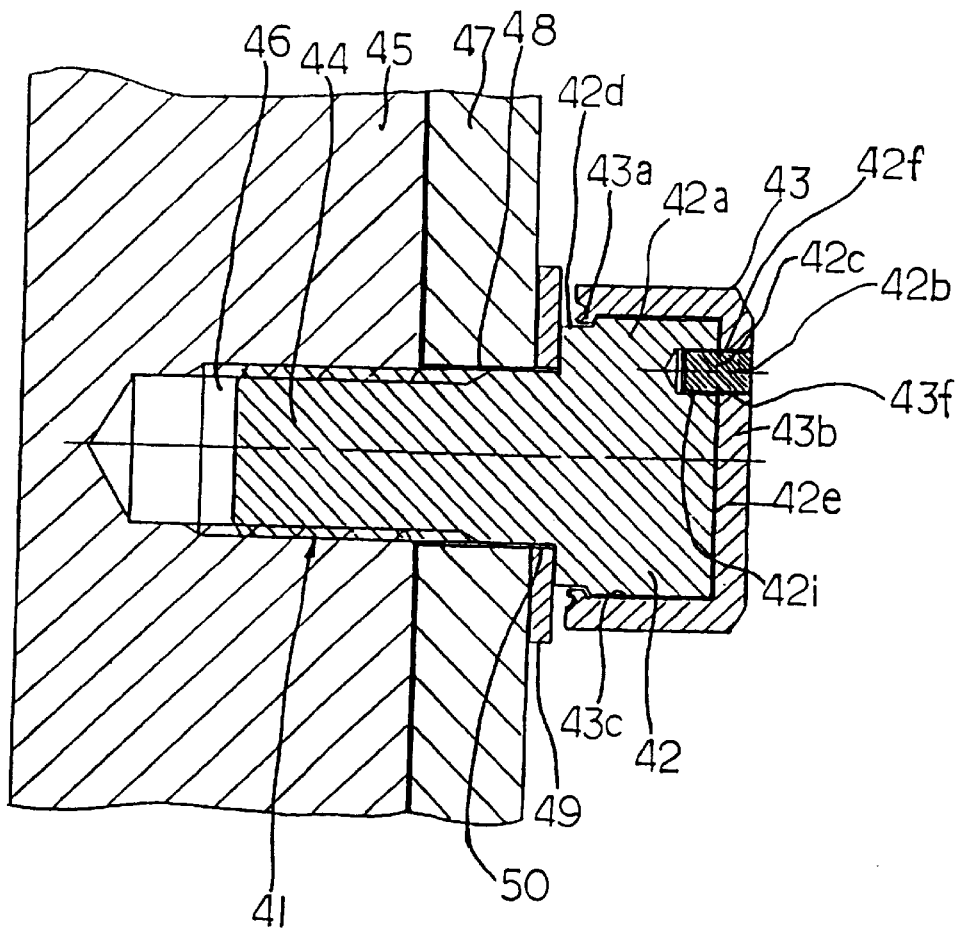
FIG. 22 is a longitudinal sectional view of the bolt unfastening preventing structure of a fourth modification of the fourth embodiment of the present invention shown in FIGS. 14 and 15, illustrating a bolt fastening portion thereof.
Figure 23:
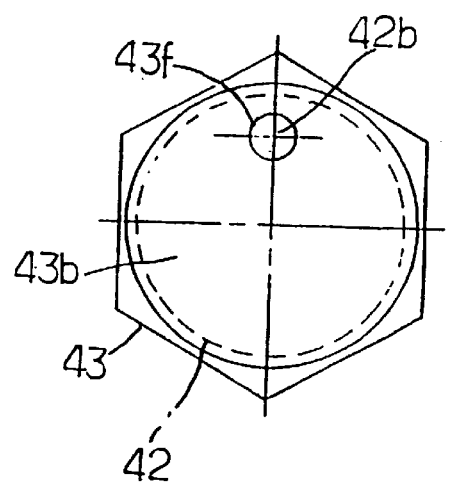
FIG. 23 is a right side view of the bolt unfastening preventing structure of the present invent shown in FIG. 22.

FIGS. 22 and 23 show a fourth modification of the fourth embodiment of the bolt unfastening preventing structure of the present invention shown in FIGS. 14 and 15. In this fourth modification of the fourth embodiment, as shown in FIG. 22, the shank portion 44 of the bolt 41 passes through both the through-hole 50 of the washer 49 and the through-hole 48 of the assembled member 47, and is then threadably engaged with the tapped bore 46 of the other assembled member 45. By rotating the protective cover member 43 relative to the tapped bore 46 of the assembled member 45, it is possible to fasten both the assembled members 45, 47 to each other by means of the head portion 42 of the bolt 41 through the washer 49.

As shown in FIGS. 22 and 23, the predetermined part 42b (to be broken) of the head portion 42 of the bolt 41 is constructed of a pin-like element fixedly mounted in a receiving bore 42i of a rear end surface 42e of the remaining part 42a of the head portion 42 of the bolt 41. This pin-like element 42b extends rearward from the rear end surface 42e of the head portion 42 of the bolt 41, and is fitted in a through-hole 43f of the inner end surface 43b of the protective cover member 43. An outer peripheral portion of the protective cover member 43 assumes a regular hexagonal shape in cross section. On the other hand, an outer peripheral portion of the remaining part 42a of the head portion 42 of the bolt 41 assumes a circular shape. The protective cover member 43 has an inner peripheral portion of its part 43c corresponding to the remaining part 42a of the head portion 42 of the bolt 41 formed into a circular shape in cross section, which enables the part 43c of the protective cover member 43 to fit onto the above circular outer peripheral portion of the remaining part 42a of the head portion 42 of the bolt 41.

As is clear from the FIG. 22, formed between the predetermined part 42b and the remaining part 42a of the head portion 42 of the bolt 41 to be broken is an annular groove 42f which assumes a V-shaped form in cross section. Due to the formation of this annular groove 42f, the weak portion 42c reduced in diameter is formed in the predetermined part or pin-like element 42b. In use, when a predetermined torque is applied to the head portion 42 of the bolt 41 through the protective cover member 43, a stress is concentrated at the V-shaped part of the weak portion 42c of the pin-like element 42b to cause the breakage of the head portion 42 of the bolt 41 in this weak portion 42c, so that the head portion 42 of the bolt 41 is divided into two pieces, i.e., the predetermined part 42b and the remaining part 42a.

In this fourth modification of the fourth embodiment, it is also possible to provide a plurality of the pin-like elements 42b. Further, it is also possible to provide the pin-like element 42b in an outer peripheral surface of the head portion 42 of the bolt 41 instead of the rear end surface of the head portion 42 of the bolt 41. Further, it is also possible to provide a plurality of the pin-like elements 42b in the side surface or the rear end surface of the head portion 42 of the bolt 41. Further, it is also possible to use a suitable extension or projection of the head portion 42 of the bolt 41 in place of the pin-like element 42b fitted in the remaining part 42 a of the head portion 42 of the bolt 41.

In this fourth modification of the fourth embodiment, as shown in FIG. 22, the protective cover member 43 has an inner peripheral portion 43a of a front end of its opening portion swaged or squeezed up against a front surface of an outer peripheral shoulder portion 42d of the head portion 42 of the bolt 41. After that, the protective cover member 43 has its inner end surface 43b brought into press contact with the rear end surface 42e of the head portion 42 of the bolt 41, whereby the protective cover member 43 is prevented from dropping out from the head portion 42 of the bolt 41.

Alternatively, it is also possible to press-fit a suitable lock pin (not shown) in a bore (not shown) of an outer peripheral surface of the protective cover member 43, wherein the thus press-fitted lock pin (not shown) radially inwardly extends to enter an annular groove (not shown) of an outer peripheral surface of the remaining part 42b of the head portion 42 of the bolt 41 to rotatably hold the protective cover member 43 on the remaining part 42a of the head portion 42 of the bolt 41.

In each of the above embodiments and their modifications of the present invention, the washer 30, 49 may be constructed of an ordinary flat washer, or of a spring washer, or may be eliminated. It is also possible for the predetermined part 6b, 24b, 42b to assume any other suitable shape such as square shapes, oval shapes and like shapes in cross section, provided that such suitable shape is capable of transmitting the torque from the protective cover member 7 (called "cylindrical cover member"), 23, 43 to the predetermined part 6b, 24b, 42b.

The effects of the fourth embodiment of the present invention are as follows: namely, in the bolt unfastening preventing structure of the fourth embodiment, when the predetermined torque is applied to the bolt 41, the head portion 42 of the bolt 41 is broken at its predetermined part 42b which is separated from the remaining part 42a of the bolt 41. Consequently, after such breakage of the bolt 41 occurs, any torque can't be transmitted from the thus broken and separated predetermined part 42b to the remaining part 42a of the bolt 41 even when the head portion 42 of the bolt 41 is rotated in its unfastening direction. This is because the remaining part 42a (i.e., the shank portion 44) of the bolt 41 remains fastened tight to the tapped bore 46 of the assemble member 45 in its initial fastened position after the breakage of the predetermined part 42b of the bolt 41 due to application of the predetermined amount of torque thereto. Consequently, it is possible for the present invention to prevent, without fail, the bolt 41 from being illegally unfastened.

What is claimed is:

1. A bolt/nut unfastening preventing structure, comprising:

a bolt (3) having its shank portion (4) pass through through-holes (2) of assembled members (1);

a fastening nut (5) threadably fitted to said bolt (3) to fasten said assembled members (1) between said bolt and fastening nut;

a stopper nut (6) fitted to said bolt (3) after said assembled members (1) are fastened between said fastening nut (5) and said bolt (3), said stopper nut (6) being disposed adjacent to said fastening nut (5) and in press-contact with said fastening nut (5) to prevent said fastening nut (5) from loosening relative to said bolt (3);

said stopper nut (6) being constructed of a main body portion (6a) and a driven portion (6b), wherein said main body portion (6a) of said stopper nut (6) is loosely received in an opening end portion (7a) of a cylindrical cover element (7) so as to be capable of freely rotatable relative to said opening end portion (7a) of said cover element (7), and is fastened tight to said fastening nut (5), wherein said driven portion (6b) of said stopper nut (6) is not fitted to said shank portion (4) of said bolt (3), but is fitted to a driving portion (7b) of said cylindrical cover element (7) so as to rotate together with said cylindrical cover member (7), said driving portion (7b) constituting the innermost portion of said cylindrical cover element (7);

and wherein said stopper nut (6) is further provided with a weak portion (6c) between said main body portion (6a) and said driven portion (6b), said weak portion (6c) being determined in mechanical strength so as to be broken when a predetermined torque is applied to said cylindrical cover element (7) so as to have said main body portion (6a) of said stopper nut (6) fastened tight to said fastening nut (5).

2. The bolt/nut unfastening preventing structure of claim 1, wherein said cylindrical cover element (7) is retained onto said stopper nut (6) by a front end portion (7e) being swaged or squeezed against an outer peripheral surface of a shoulder portion (6d) of the stopper nut (6).

3. A bolt/nut unfastening preventing structure, comprising:

a bolt (21) provided with a shank portion (21b);

a double-structured nut (22) constructed of an outer casing (23) and an inner fastening member (24);

said double-structured nut (22) being fitted to said shank portion (21b) of said bolt (21);

wherein, when said double-structured nut (22) has said inner fastening member (24) thereof fastened tight to said shank portion (21b) of said bolt (21) with a predetermined torque, a predetermined part (24b) of said inner fastening member (24) of said double-structured nut (22) can be broken to permit said outer casing (23) of said double-structured nut to freely rotate relative to the remaining part (24a) of said inner fastening member (24) thus fastened to said shank portion (21b) of said bolt (21).

4. A bolt/nut unfastening preventing structure according to claim 3, wherein said predetermined part (24b) can be broken from a remaining portion (24a) at a weak portion (24c).

5. The bolt/nut unfastening preventing structure of claim 4, wherein said predetermined part (24b) is a pin-like element extending axially between said outer casing (23) and said inner fastening member (24).

6. The bolt/nut unfastening preventing structure of claim 5, wherein said pin-like element (24b) is fixedly mounted in a receiving bore (24f) formed in said rear surface of said remaining part (24a) and extends through a hole (231) of said outer casing (23).

7. The bolt/nut fastening preventing structure of claim 3, wherein said outer casing (23) is retained onto said inner fastening member (24) by a retaining ring (23f) fitted into an annular groove (23e) provided in a front-end portion of said outer casing (23).

8. The bolt/nut unfastening preventing structure of claim 3, wherein said outer casing (23) is retained onto said inner fastening member (24) by a retaining ring (23h) fitted into an annular groove (23g) provided in a rear end opening portion of said outer casing (23).

9. A bolt unfastening preventing structure comprising:

a bolt provided with a head portion;

a protective cover member fitted onto said head portion of said bolt so as to rotate together with said head portion of said bolt and not to separate therefrom;

said head portion of said bolt having a predetermined part thereof broken when subjected to a predetermined torque, to permit said predetermined part of said head portion of said bolt to freely rotate together with said protective cover member relative to the remaining part of said head portion of said bolt.

10. A bolt unfastening structure according to claim 9, wherein said head portion (42) contains an annular groove (42f) and has a concave portion (42g) formed in a rear end surface (42e) of the head portion, so as to provide a weak portion (42c) which can be broken when the head portion (42) is subjected to a predetermined torque.

11. A bolt unfastening structure according to claim 9, wherein said predetermined part (42b) provided between said protective cover (43) and said head portion (42) is a pin-like element.

12. The bolt unfastening preventing structure of claim 9, wherein said protective cover member (43) has an integral peripheral front end portion (43a) of its opening portion swaged or squeezed against an outer peripheral shoulder portion (42d) of the head portion (42), whereby said protective cover member (43) is retained onto said head portion (42).

13. In a bolt/nut unfastening preventing structure comprising: a double-structured nut constructed of an outer casing and an inner fastening member; a bolt provided with a shank portion; said double-structured nut being fitted to said shank portion of said bolt; wherein, when said double-structured nut has said inner fastening member thereof fastened tight to said shank portion of said bolt with a predetermined torque, apart of said inner fastening member of said double-structured nut is broken to permit said outer casing of said double-structured nut to freely rotate relative to said inner fastening member thus fastened to said shank portion of said bolt, the improvement wherein:

a predetermined part of said inner fastening member to be broken is fitted in said outer casing so as to not rotate relative to said outer casing;

the remaining part of said inner fastening member other than said predetermined part is fitted in said outer casing so as to be rotatable relative to said outer casing;

said predetermined part of said inner fastening member is connected with said remaining part of said inner fastening member through a weak portion;

whereby said inner fastening member is designed to be broken in said weak portion.

14. A bolt unfastening preventing structure, comprising:

a bolt (41) provided with a head portion (42);

a protective cover member (43) fitted onto said head portion (42) of said bolt so as to rotate together with a predetermined part (42b) of said head portion and not to separate therefrom;

said head portion (42) of said bolt having [a] said predetermined part (42b) thereof broken when subjected to a predetermined torque so as to permit said predetermined part (42b) of said head portion (42) of said bolt to freely rotate together with said protective cover member (3 relative to the remaining part (42a) of said head portion of said bolt (44).

* * * * *